United States Patent

[11] 3,595,497

| [72] | Inventor | Horace Boatright<br>Dom Bldg., Temple, Tex. 76501 |
|---|---|---|
| [21] | Appl. No. | 821,237 |
| [22] | Filed | May 2, 1969 |
| [45] | Patented | July 27, 1971 |

[54] TROTLINE REEL AND MOUNTING AND OPERATING MEANS THEREFOR
1 Claim, 3 Drawing Figs.

[52] U.S. Cl. .................................................. 242/99,
242/86.7, 242/106, 242/156.1
[51] Int. Cl. .................................................. B65h 75/00
[50] Field of Search.......................................... 242/84.5,
86, 86.5 A, 86.7, 99, 106, 107, 156.1

[56] References Cited
UNITED STATES PATENTS

| 524,957 | 8/1894 | Semple.......................... | 242/156.1 |
| 1,398,347 | 11/1921 | Stott.............................. | 242/156.1 |
| 1,614,497 | 1/1927 | Simoneau, Sr.................. | 242/156.1 UX |
| 1,912,013 | 5/1933 | Schneider...................... | 242/156.1 |
| 1,934,104 | 11/1933 | Svensson....................... | 242/156.1 X |
| 2,049,086 | 7/1936 | Shingleton..................... | 242/99 X |
| 2,416,585 | 2/1947 | Holub............................ | 242/156.1 |
| 2,734,694 | 2/1956 | Davidson....................... | 242/106 |

FOREIGN PATENTS

| 968,533 | 11/1950 | France ......................... | 242/156.1 |

*Primary Examiner*—Stanley N. Gilreath
*Assistant Examiner*—Werner H. Schroeder
*Attorney*—Peck and Peck ABSTRACT: A trotline reel having a U-shaped basic frame, a reel rotatably mounted between the arms of the frame and adjacent the free ends thereof, a rigid bar fixed to the bridge of the frame and extending therefrom toward and spaced above the body of the reel, a brake and a backlash eliminator pivotally mounted on the end of the rigid bar and extending downwardly therefrom toward and in engagement with the reel body and/or the line wound thereon, and biasing means fixed to the rigid bar and the brake and backlash eliminator in position constantly urging said brake and backlash eliminator toward and into engagement with the reel and/or the line thereon.

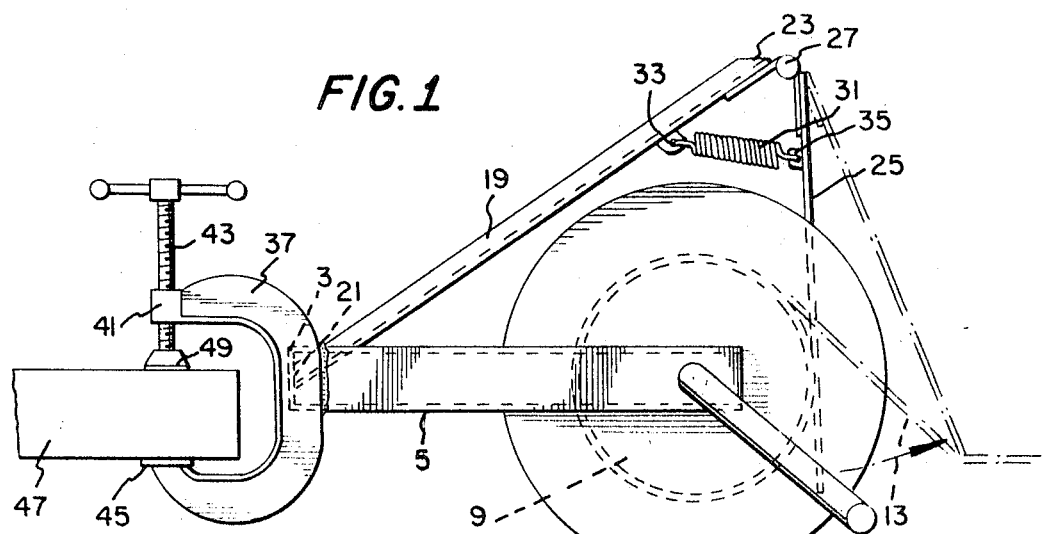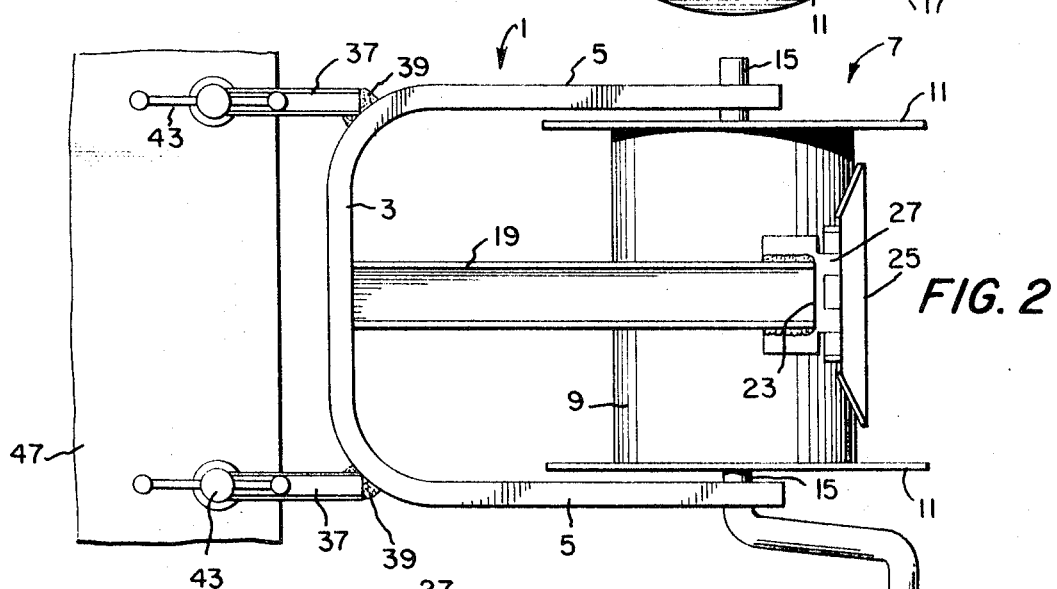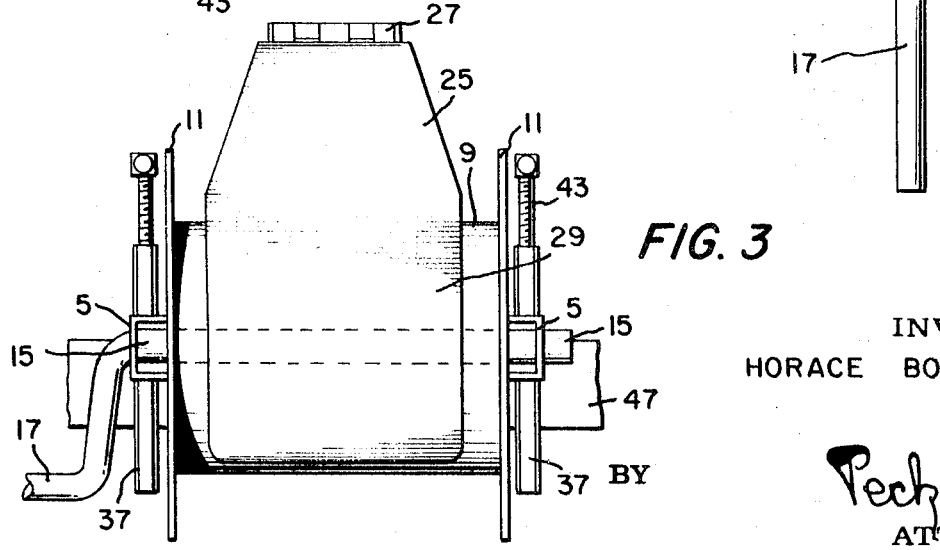

TROTLINE REEL AND MOUNTING AND OPERATING MEANS THEREFOR

This invention relates broadly to the art of trotline reels, and in its more specific aspects it relates to an ingenious mounting and frame arrangement for the reel, and a mounting and operational arrangement for the reel, and a mounting and operational arrangement for an automatic brake for the reel and backlash eliminator; and the nature and objects of the invention will be readily recognized and understood by those skilled in the arts to which it relates in the light of the following explanation and detailed description of the accompanying drawings illustrating what I at present believe to be preferred embodiments or mechanical expressions of my invention from among various other forms, arrangements, combinations, and constructions, of which the invention is capable within the spirit and scope thereof.

If has been one of my major purposes in devising this trotline reel to provide a sturdy, simple and inexpensively produced mounting arrangement for the reel and the brake and backlash eliminator. One of the problems which is inherent in devices of this character resides in the distinct possibility that in the operation of unwinding the line from the reel, the reel has a tendency to rotate too rapidly so that the line being played out often is not played out as rapidly as the reel is rotating, so the line commences to wind again in the wrong direction on the reel. It will be evident that such backlash is highly undesirable since the line may well become tangled, and in straightening the mechanism out for further operation, in the normal and desired fashion, valuable time and effort are lost. In solving this problem I have provided a combination brake and backlash eliminator which functions in a noncomplex manner to insure that the line will properly be unwound from the reel and the speed of rotation of the reel will be automatically controlled. In designing an innovation, with the highly advantageous characteristics of the reel herein involved, I have not sacrificed simplicity of the reel mounting arrangement so that it may be produced at a cost which is far from prohibitive. The mounting and supporting arrangement for the reel, and for mounting the entire apparatus on a supporting surface, comprises relatively few elements which are all operatively combined in a fashion to produce a reel with sound operating characteristics and one which may be mounted on a supporting surface with facility.

With the foregoing general objects, features and results in view, as well as certain others which will be apparent from the following explanation, the invention consists in certain novel features in design, construction, mounting and combination of elements, as will be more fully and particularly referred to and specified hereinafter.

Referring to the accompanying drawings:

FIG. 1 is a side elevational view illustrating the apparatus in mounted, operative position.

FIG. 2 is a top plan view of the apparatus.

FIG. 3 is a front elevational view of the apparatus.

In the accompanying drawings, I have used the numeral 1 to designate, in its entirety, the basic frame of my trotline reel. The basic frame is of generally U-shaped configuration comprising a bridge portion 3 from the ends of which forwardly extend a pair of arms 5. The basic frame 1 is preferably formed of metal and is preferably, though not necessarily, of channel shape in cross section, as clearly illustrated in FIG. 3 of the drawings.

Operatively mounted adjacent to but rearwardly spaced from the forward ends of the arms 5, and operable therebetween, is a line winding reel, which I have designated generally by the numeral 7. The reel 7 comprises a body portion 9, of generally cylindrical form, and of an axial length less than the distance between the spaced apart arms 5 of the basic frame 1. Fixed, in any suitable manner, to each end of the drumlike body 9, of the reel 1, is an annular flange 11 which, along with the body 9 provides a winding medium for the line 13. Projecting from each end of the reel 7 is a stub shaft 15, one of such shafts being of lengthened form and bent in a manner to provide a manual operating means 17 which functions to rotate the reel 7 in the operation of winding the line 13 on the reel 7. It will be apparent, from consideration of the drawings, that by means of the stub shafts 15, which are journaled in and extend through the ends of the arms 5, adjacent to but rearwardly spaced from the ends thereof, the reel 7 is rotatively mounted and operative between the arms 5 of the basic frame 1.

I provide a rigid bar 19, which is preferably formed of channel shape in cross section, and this bar 19 functions as an operative supporting means for the brake and backlash eliminator, and also as a means for mounting the biasing means for the brake and backlash eliminator. The bar 19 is welded or otherwise suitably fixed to the bridge 3 of the basic frame 1, intermediate the ends thereof as at 21. The bar 19 is so mounted and affixed to the bridge 3 so that it extends diagonally upwardly therefrom, and is of a length so that it extends over and above the center portion of the body 9 of the reel, and the upper or forward end 23 of the bar 19 is positioned above and over the body of the reel towards the forward portion thereof, as clearly illustrated in FIGS. 1 and 3.

I provide a brake and backlash eliminator 25 which is a platelike member and is hingedly mounted as at 27 to the upper forward end 23 of the bar 19. The brake and backlash eliminator 25 extends from its hinged mounting downwardly and over and against the body 9 of the reel and between the annular flanges 11 thereof. Consideration of the drawings clearly indicates that that portion 29 of the brake and backlash eliminator 25 which is in the general plane of the body 9 of the reel is of less width than the distance between the flanges 11, but is of a width which is at least three-fourths of the distance between the flanges 11. Biasing means 31, in the form of a coil spring, is fixed to the underside of the bar 19, as at 33, and extends therefrom and is fixed to the underside of the brake and backlash eliminator, as at 35.

A pair of clamping means 37 of generally C-shaped configuration is fixed to the basic frame 1 at points 39 thereon, which are positioned where the bridge 3 merges into each arm 5, it will be understood that one clamping means 37 is fixed to each side of the basic frame. The clamping means 37 extend rearwardly from their fixed points so that the openings in the C-shaped means face toward the rear of the apparatus. The upper arm of each C-shaped clamping means is provided with an internally threaded collar 41 into which is threaded a tightening wing nut 43. The other or lower arm of the C-shaped clamping means is preferably provided with a flat clamping surface 45.

It will now be apparent that my entire apparatus may be mounted on any suitable supporting means 47, by so positioning the apparatus that the supporting means 47 extends between the arms of the C-shaped clamping means as clearly illustrated in FIG. 1. With the elements so arranged and positioned each wing nut 43 is threaded downwardly through its internally threaded collar 41 until the bearing surface 49 on the end thereof is in clamping engagement with the top surface of the supporting means 47 to securely clamp the apparatus on the supporting means 47 in position extending forwardly therefrom.

With the apparatus operatively mounted, as described, the manual operating handle 17 may be actuated to rotate the reel 1 in a direction to wind the line 13 thereon. The biasing means for the brake and backlash eliminator is of the proper strength so that the line may be wound over the body of the reel thereunder. When it is desired to let the line 13 run out from the reel, in the operation of placing the line in the water for the catching operation, the boat upon which the support 47 is carried travels forwardly so that the line will run from the reel, it will be recognized, that in this operation, the brake and backlash eliminator 25 will function to slow up or retard the speed of rotation of the reel and prevent line backlash which would otherwise occur.

I claim:

1. A reel having a body and including, in combination, a U-shaped frame, and means for mounting said frame on a supporting member said reel rotatively mounted between the arms of said U-shaped frame and adjacent to but rearwardly removed from the forward ends thereof, a rigid bar fixed to the bridge connecting the arms of said U-shaped frame and said bar extending diagonally upwardly and forwardly to a point over and spaced from said reel in an extended vertical plane from the body of said reel, and forwardly with respect to the axis of the reel, and a brake and backlash eliminator hingedly connected to the forward end of said rigid bar and extending downwardly in engagement with the reel, a coil spring biasing said brake and backlash eliminator into engagement with said reel, and said coil spring fixed to said rigid bar and said brake and backlash eliminator and extending therebetween.